(12) United States Patent
Ishikawa

(10) Patent No.: US 8,212,852 B2
(45) Date of Patent: Jul. 3, 2012

(54) IMAGE WRITING DEVICE USING DIGITAL LIGHT-EMITTING ELEMENTS

(75) Inventor: Naoichi Ishikawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 12/914,777

(22) Filed: Oct. 28, 2010

(65) Prior Publication Data

US 2011/0043595 A1 Feb. 24, 2011

Related U.S. Application Data

(62) Division of application No. 11/456,269, filed on Jul. 10, 2006, now Pat. No. 7,852,362.

(30) Foreign Application Priority Data

Jul. 15, 2005 (JP) ................................. 2005-207393
Sep. 16, 2005 (JP) ................................. 2005-269681

(51) Int. Cl.
*B41J 2/435* (2006.01)
*B41J 2/47* (2006.01)
(52) U.S. Cl. ......................... 347/237; 347/247; 347/253
(58) Field of Classification Search .................. 347/237, 347/247, 253
See application file for complete search history.

(56) References Cited

U.S. PATENT DOCUMENTS

| | | | | |
|---|---|---|---|---|
| 5,493,322 A | * | 2/1996 | Ng et al. ........................ | 347/240 |
| 6,084,981 A | * | 7/2000 | Horiba et al. .................. | 382/157 |
| 7,453,485 B2 | | 11/2008 | Ishikawa | |
| 7,787,002 B2 | | 8/2010 | Ishikawa | |
| 2001/0036317 A1 | * | 11/2001 | Mori ............................. | 382/195 |
| 2003/0095272 A1 | | 5/2003 | Nomizu | |
| 2004/0021760 A1 | | 2/2004 | Tokunaga | |
| 2005/0062838 A1 | * | 3/2005 | Kudou .......................... | 347/238 |
| 2005/0117133 A1 | * | 6/2005 | Ishikawa ....................... | 355/18 |
| 2005/0237374 A1 | | 10/2005 | Kataoka et al. | |
| 2006/0033729 A1 | * | 2/2006 | Yoshida et al. ............... | 345/207 |

FOREIGN PATENT DOCUMENTS

| | | |
|---|---|---|
| JP | 5-75814 | 3/1993 |
| JP | 6-270471 | 9/1994 |
| JP | 2000-37908 | 2/2000 |
| JP | 2001-121745 | 5/2001 |
| JP | 2002-283609 | 10/2002 |
| JP | 2005-169799 | 6/2005 |

OTHER PUBLICATIONS

Japanese Office Action issued Mar. 8, 2011, in Patent Application No. 2005-207393.
Japanese Office Action issued Mar. 8, 2011, in Patent Application No. 2005-269681.

* cited by examiner

*Primary Examiner* — Stephen Meier
*Assistant Examiner* — Sarah Al Hashimi
(74) *Attorney, Agent, or Firm* — Oblon, Spivak, McClelland, Maier & Neustadt, L.L.P.

(57) ABSTRACT

An image-data transfer controller divides one line of image data for each of the light-emitting-element array units, transfers the divided image data to respective light-emitting-element array units, to drive each of the light-emitting elements in the light-emitting-element array units for an exposure in a main-scanning direction. The image-data transfer controller divides the one line of image data for each of the light-emitting-element array units and transfers the divided image data during one-line interval in the main-scanning direction, performs a plurality of data transfers in the one-line interval for driving each of the light-emitting elements by controlling a lighting time, and includes a plurality of lines of storing units.

10 Claims, 11 Drawing Sheets

IMAGE

IMAGE WRITING DEVICE USING DIGITAL LIGHT-EMITTING ELEMENTS

CROSS-REFERENCE TO RELATED APPLICATIONS

This application is a divisional application of U.S. application Ser. No. 11/456,269 filed Jul. 10, 2006, which is herein incorporated by reference. U.S. application Ser. No. 11/456,269 claims priority to Japanese Application No. 2005-207393, filed on Jul. 15, 2005 and Japanese Application No. 2005-269681 filed on Sep. 16, 2005, the entire contents of both are incorporated herein by reference.

BACKGROUND OF THE INVENTION

1. Field of the Invention

The present invention relates to an image writing device using digital light-emitting elements such as a light emitting diode (LED) array.

2. Description of the Related Art

Generally, image writing devices that write latent images by irradiating light on a photo-sensitive element include a laser diode (LD) scanning method and a method of using an array of light-emitting elements in which LED elements are arranged in an array.

In the method of using an array of light-emitting elements, when a binary image is output by an image forming apparatus, one dot print can be printed in a rounded elliptical shape according to a process condition. In a case of one-dot lattice image (an image at 5-mm interval), this phenomenon appears clearly, and a vertical line is printed thicker than a horizontal line. This causes a problem of aspect ratio.

To solve the problem of aspect ratio, there is a method of controlling the problem by LED balance correction data. As a correspondence with multilevel data, tone data for each LED, data for correcting an output difference in a unit of block including a plurality of LEDs, and data for correcting an output difference with respect to a mean value of the block are added, and a difference in LEDs is suppressed according to the added data.

A conventional technique is described in Japanese Patent Application Laid-Open No. 2002-283609, in which writing devices formed of a plurality of LED heads (a light-emitting-element array unit) arranged, with an imaging position being shifted in a rotation direction of a photo-sensitive element, are provided in a staggered arrangement along an axial direction of the photo-sensitive element, image data to be transferred to the respective LED heads is divided by an LED write control circuit for each LED head based on an instruction from a printer control circuit, and the divided image data is transmitted to the respective LED heads, with the image data being shifted timewise in the rotation direction (feed direction) of the photo-sensitive element by a position to be imaged. Japanese Patent Application Laid-Open No. H6-270471 discloses a technique in which a divided exposure data transfer method is effectively used, to form a dot latent image on a photo-sensitive element, while appropriately lighting up LED elements arranged in a line multiple times in a sub-scanning direction for each one scanning line, and lighting frequency in the sub-scanning direction is controlled based on a correction value corresponding to a difference in an amount of light between the LED elements. Furthermore, Japanese Patent Application Laid-Open No. 2001-121745 discloses a technique in which a light-emitting element having a beam diameter in the sub-scanning direction different from an original beam diameter (a beam diameter as a reference) is lighted up multiple times with respect to one lighting signal with an intensity (an amount of light) different from an original intensity, with the position thereof being changed in the sub-scanning direction, so that a composite profile thereof is made to match an original beam diameter profile, thereby suppressing density nonuniformity caused by a difference in beam diameter in the sub-scanning direction for each light-emitting element.

A binary method includes a control by adding binary image data and correction data for each LED, to reproduce a tone with high fidelity. In this method, since dot printing power (print driving current control) is adjusted, line drawing is improved. However, vertical and horizontal line widths are not improved.

There are also methods in which the correction data and the printing image data are not added according to the LED array.

In a technique disclosed in Japanese Patent Application No. 2003-412065, control is performed by setting the lighting frequency for several times. In a light-emitting-element array unit in which after transferring even pixel data of image data, odd pixel data is transferred, the light-emitting elements are lighted up twice with one image transfer.

In a technique disclosed in Japanese Patent Application No. 2005-36620, data transfer is performed in a manner that even data and odd data are respectively transferred several times (twice). In a case of even data, pattern recognition is performed in a main-scanning direction at the time of data transfer for the second time, and in a case of an isolated vertex, data is converted from "1" to "0". On the other hand, in a case of odd data, the same processing is performed for the first data, and a vertical line width is thinned by controlling the lighting time, thereby improving the vertical and horizontal line width.

In these conventional binary methods, control is performed for reproducing the tone with high fidelity by adding the binary image data and the correction data for an individual LED. However, since the dot printing power (print driving current control) is adjusted, the vertical and horizontal line widths are not improved.

Furthermore, in these conventional techniques, control with respect to a diagonal line image is not taken into consideration.

SUMMARY OF THE INVENTION

It is an object of the present invention to at least partially solve the problems in the conventional technology.

An image writing device according to one aspect of the present invention includes a plurality of light-emitting-element array units including a light-emitting element array formed with a plurality of light-emitting elements arranged in one direction, of which a light emission is controlled based on binary image data, and an imaging unit that forms an image of lights emitted by the light-emitting element array on a photo-sensitive element; and an image-data transfer controller that divides one line of image data for each of the light-emitting-element array units, transfers the divided image data to respective light-emitting-element array units, to drive each of the light-emitting elements in the light-emitting-element array units for an exposure in a main-scanning direction. The image-data transfer controller performs a plurality of data transfers during one-line interval in the main-scanning direction, while performing a data processing of the one line of image data in the respective light-emitting-element array units, to drive the light-emitting element array.

An image writing device according to another aspect of the present invention includes a plurality of light-emitting-element array units including a light-emitting element array formed with a plurality of light-emitting elements arranged in one direction, of which a light emission of the light-emitting elements being controlled based on binary image data, and an imaging unit that forms an image of lights emitted by the light-emitting element array on a photo-sensitive element; and an image-data transfer controller that divides one line of image data for each of the light-emitting-element array units, transfers the divided image data to respective light-emitting-element array units, to drive each of the light-emitting elements in the light-emitting-element array units for an exposure in a main-scanning direction. The light-emitting-element array units are arranged in a staggered pattern, being shifted by a predetermined amount in a sub-scanning direction with an axial direction of the photo-sensitive element as a main-scanning direction, and overlapped by a predetermined amount in the main-scanning direction. The image-data transfer controller divides the one line of image data for each of the light-emitting-element array units and transfers the divided image data during one-line interval in the main-scanning direction, performs a plurality of data transfers in the one-line interval for driving each of the light-emitting elements by controlling a lighting time, and includes a plurality of lines of storing units.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6A depicts a state where data is printed by one data transfer, FIG. 6B depicts a state where data is printed by two data transfers, and FIG. 6C state where data transfer is performed twice, and the second data shows a one-dot isolated vertex;

DETAILED DESCRIPTION OF THE PREFERRED EMBODIMENTS

Exemplary embodiments of the present invention will be explained below in detail with reference to the accompanying drawings.

The present invention is used for image writing devices using a light-emitting element array such as an LED array, and image forming apparatuses such as a printer, a digital copying machine, and a copying machine including the image writing device. More specifically, the present invention relates to the image writing device that can increase and decrease print density with respect to one line width, thereby considerably improving one dot printing rate. The present invention is specifically explained below.

Figure 1:
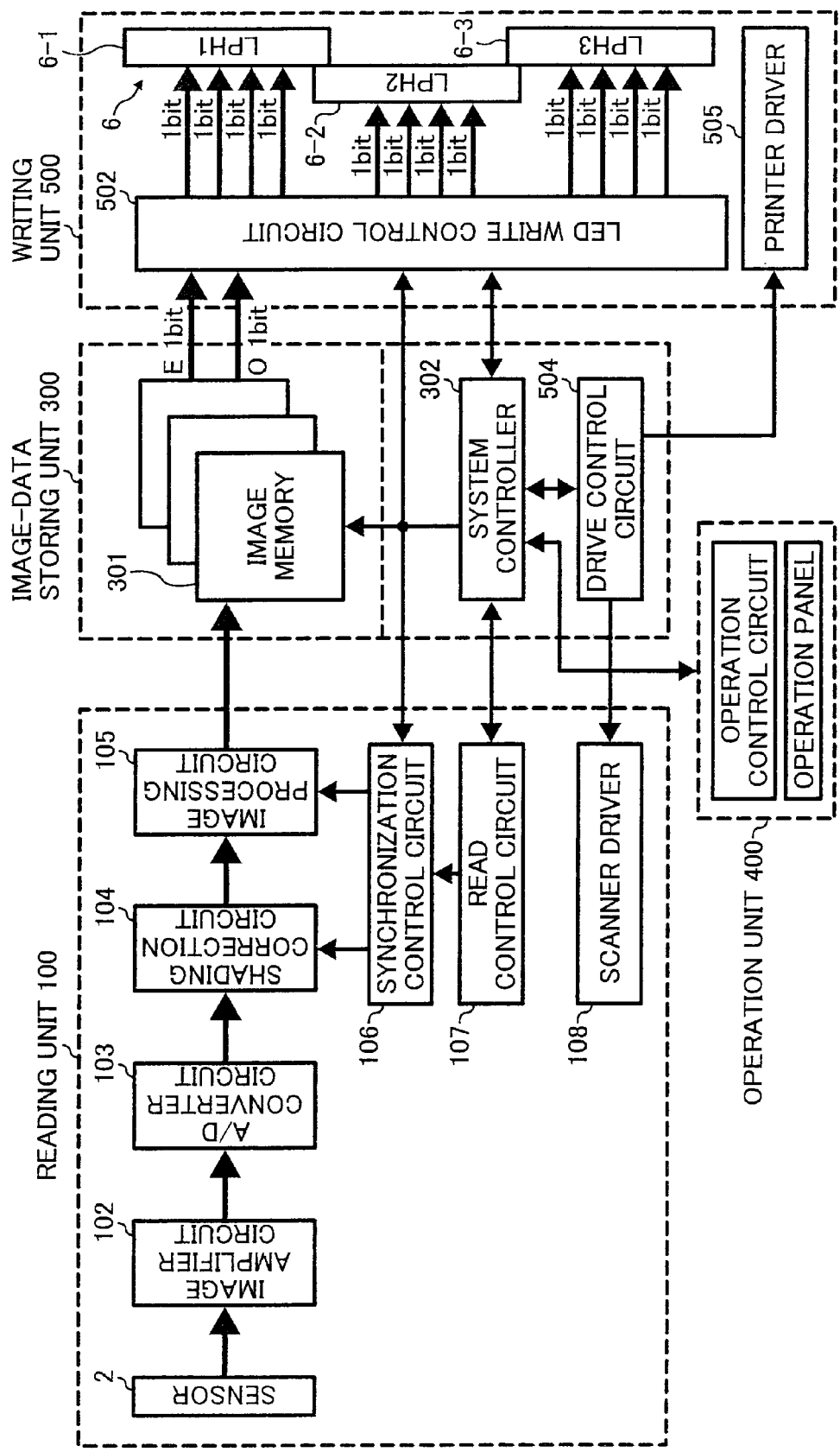
FIG. 1 is a block diagram of an image forming apparatus (a digital copying machine), to which an image writing device according to a first embodiment of the present invention is applied.

FIG. 1 is a block diagram of an image forming apparatus (a digital copying machine), to which an image writing device according to a first embodiment of the present invention is applied.

As shown in FIG. 1, the digital copying machine includes a reading unit 100 as a read unit that reads a document, an image-data storing unit 300 as a storage unit that stores the read document data, a writing unit 500 for copying the stored data on recording paper, a system controller 302 that controls execution of a series of processes, an operation unit 400 that performs key input with respect to the system controller.

Figure 2:
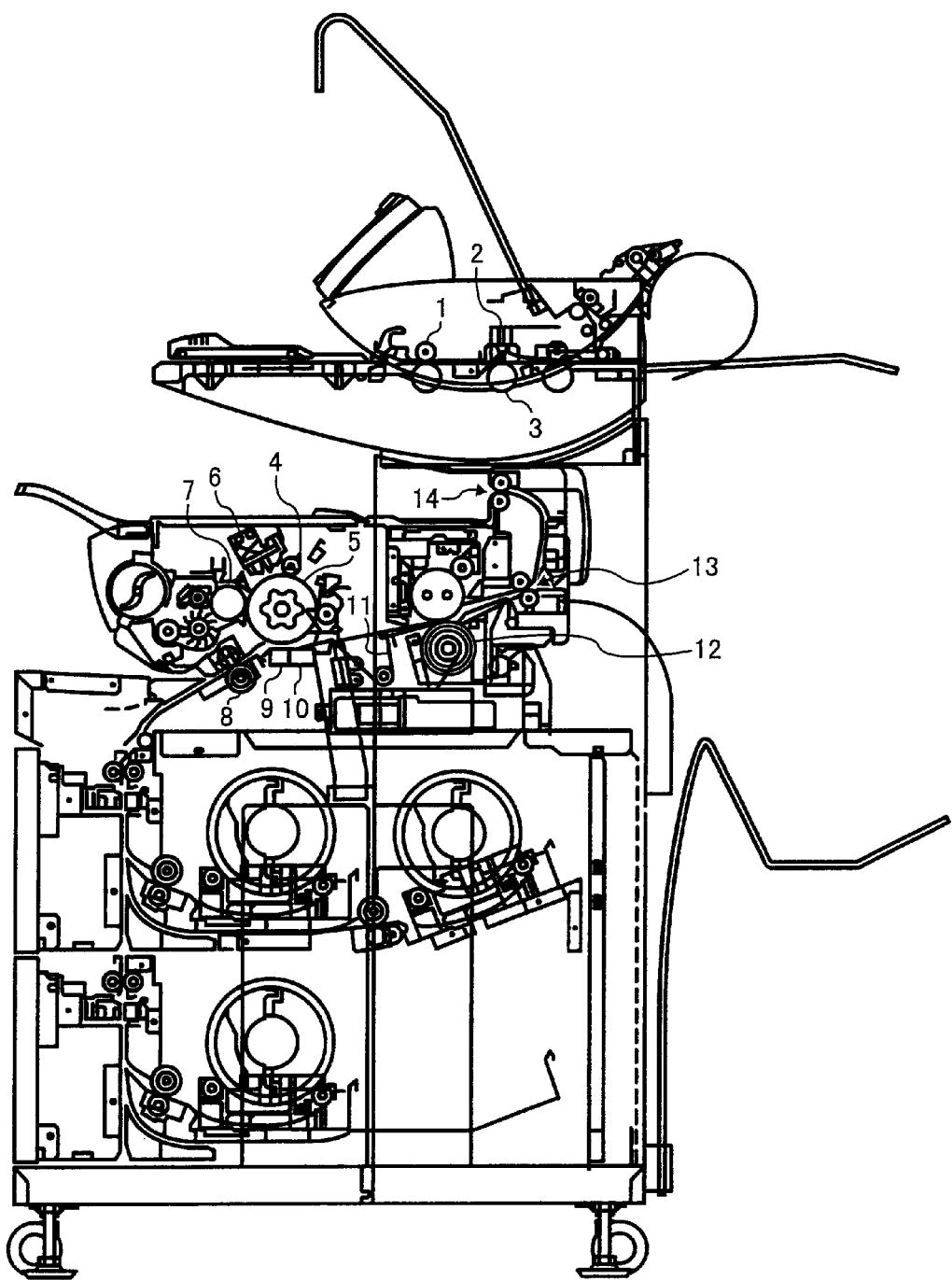
FIG. 2 is a schematic for illustrating a configuration of the digital copying machine shown in FIG. 1.

FIG. 2 is a schematic for illustrating a configuration of the digital copying machine shown in FIG. 1.

When an operator inserts a document from an insertion port, the document is carried between a sensor 2 and a white color roller 3 corresponding to rotation of a roller 1 (FIG. 2). The document being carried is irradiated by an LED fitted to the sensor 2, reflected light thereof is imaged on the sensor 2, and data of the document image is read. The document image imaged on the sensor 2 in FIG. 1 is converted to an electric signal, and the analog signal is amplified by an image amplifier circuit 102. An analog-to-digital (A/D) converter circuit 103 converts the analog image signal amplified by the image amplifier circuit 102 to a multilevel digital image signal for each pixel. The converted digital image signal is output synchronized with a clock output from a synchronization control circuit 106, whose distortion due to nonuniform light amount, stain on a contact glass, or nonuniform sensitivity of the sensor is corrected by a shading correction circuit 104. The corrected digital image data is converted to digitally recorded image data by an image processing circuit 105, and written in an image memory 301.

The system controller 302 has a function for performing overall control and smoothly controls image data transfer by a read control circuit 107, the synchronization control circuit 106, the image memory 301, and an LED write control circuit 502, and transfer of the read document and recording paper by driving a motor and the like via a scanner driver 108 and a printer driver 505 by a drive control circuit 504.

The writing unit 500 performs bit conversion of an image signal transferred by a synchronization signal clock from the image memory 301 to a unit of one pixel in the LED write control circuit 502, and converts it to infrared light by an LED print head (LPH) 503 and outputs the infrared light.

A charger (a scorotron charger with a grid) 4 that uniformly charges a photosensitive drum 5 to −1200V, a light-emitting-element array unit (LED heads) 6 in which LEDs are arranged in an array to irradiate the photosensitive drum 5 via a SEL-FOC Lens Array (SLA), and a developing unit 7 are arranged around the photosensitive drum 5. The LED heads 6 correspond to the LPH in FIG. 1.

When the LED light based on the digital image data is irradiated onto the photosensitive drum 5, charges on the surface of the photo-sensitive element flows to the earth of the photosensitive drum 5 and dissipates due to photoconductive phenomenon. The LED light is not irradiated onto a portion where the document density is thin, whereas it is irradiated onto a portion where the document density is thick. As a result, an electrostatic latent image corresponding to the light and shade of the image is formed on a portion where the LED light is not irradiated.

The electrostatic latent image is developed by the developing unit 7. Since a toner in the developing unit is negatively charged due to stirring, and a bias of −700V is applied, the toner adheres only on the portion where the LED light is irradiated.

On the other hand, the recording paper is selected from three paper feed cassettes and a manual tray, and is allowed to pass below the photosensitive drum 5 at a predetermined timing by a resist roller 8. At this time, a toner image is transferred onto the recording paper by a transfer charger 9. The recording paper is separated from the photosensitive drum 5 by a separation charger 10, and carried by a carrier tank 11 and fed to a fixing unit 12, and the toner is fixed on the recording paper. The recording paper on which the toner is fixed is carried to the front or back of the machine and discharged onto a paper ejection tray 14 or 13.

As a flow of the image signal, binary image data formed of even pixels (EVEN) and odd pixels (ODD) are fed to the LED write control circuit 502 at a transfer rate of 16 MHz. The image signal transferred in two pixels parallel to each other is once synthesized to one line in the LED write control circuit 502, divided and allocated to three, and four pixels are simultaneously transferred respectively to LED heads 6-1, 6-2, and 6-3.

Figure 3A:
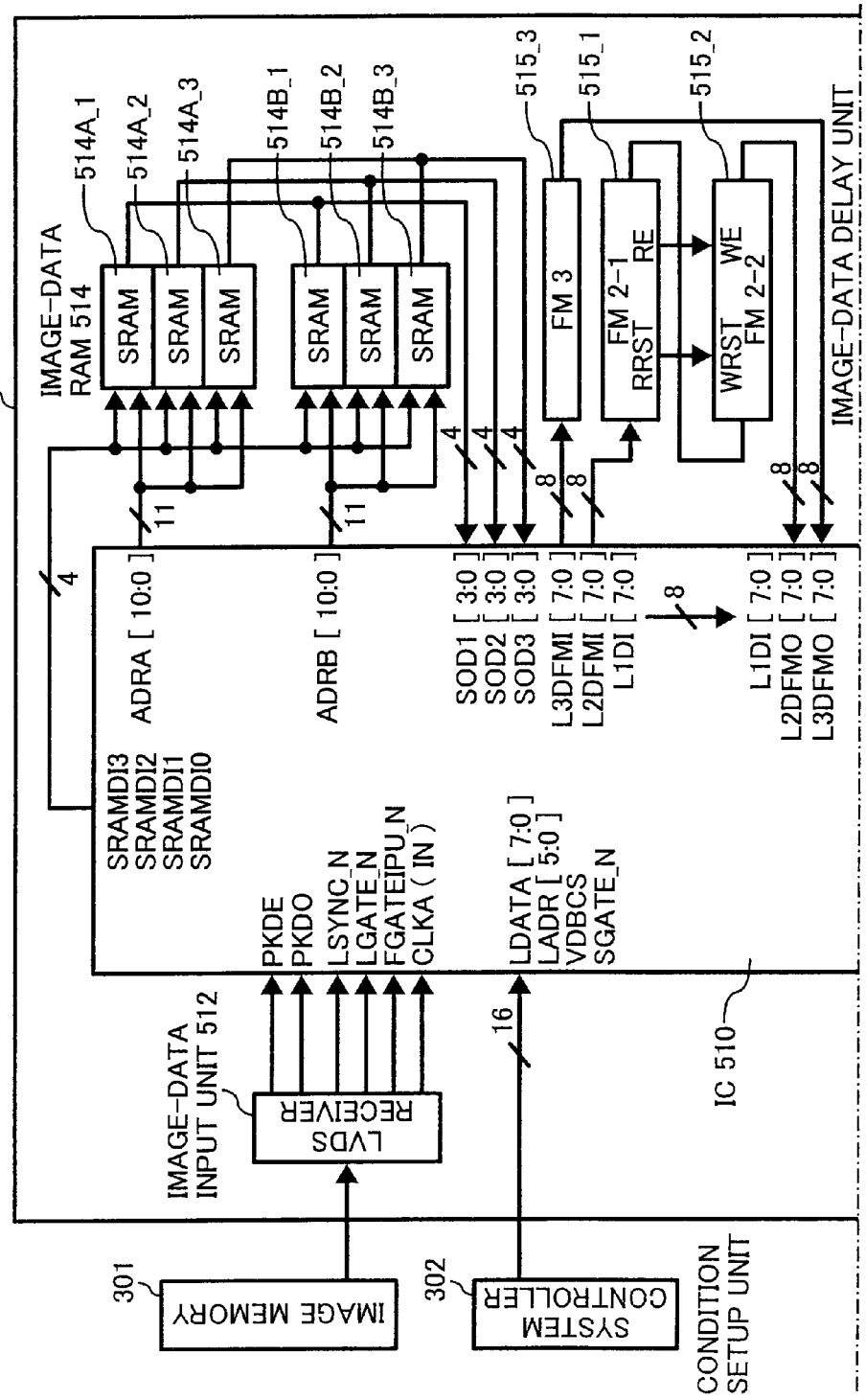
FIG. 3 is a block diagram of an LED write control circuit shown in FIG. 1.
Figure 3B:
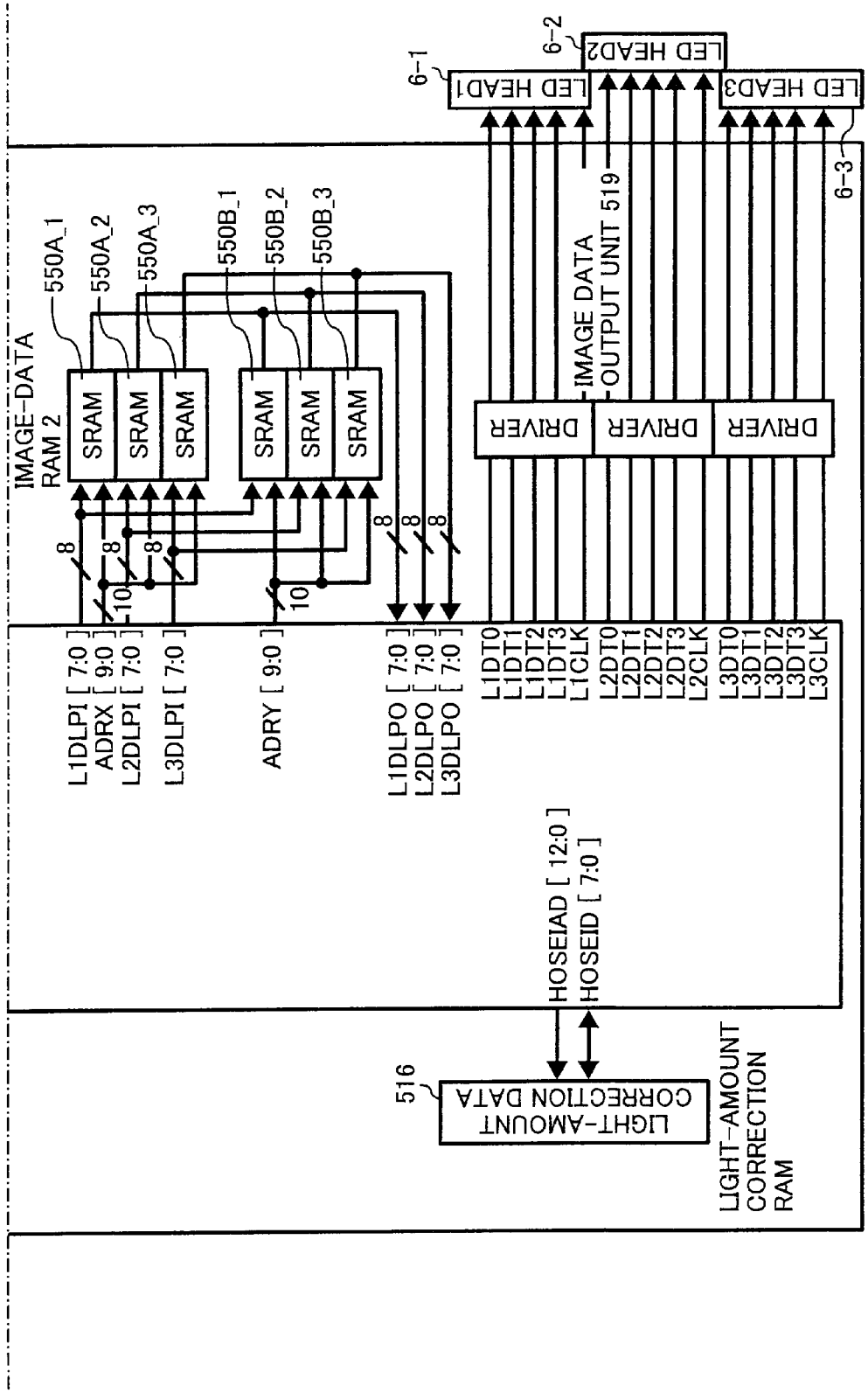

FIG. 3 is a block diagram of the LED write control circuit 502 shown in FIG. 1.

The binary image signal, the even pixels (EVEN), the odd pixels (ODD), and a timing signal are converted from parallel signals to serial signals by a low-voltage operation signal element LVDS driver, and transmitted from the image memory 301 to the LED write control circuit 502 at 16 MHz. The LED write control circuit 502 uses an LVDS receiver 512, to convert the signals from serial signals to parallel signals, and input the parallel signals to an integrated circuit (IC) 510 as PKDE•PKDO•CLKA•LSYNC_N•LGATE_N•FGATE_N.

The image signal including the even pixels (EVEN) and the odd pixels (ODD) input to the IC 510 is divided into a unit of four pixels, and stored in three A-group static RAMs (SRAMs) (514A_1 to 514A_3) and three B-group SRAMs (514B_1 to 514B_3) at a transfer rate of 8 MHz, in SRAM address signals ADRA [10:0] and ADRB [10:0] as SRAMDI [3:0].

Since the total dot number is 23040 dots (A3 width, 7680 dots×3) and the image signal transfer depends on a three-division method, with respect to an image signal for one line in main-scanning, an image signal at the LED head 6-1 is stored in the SRAM 514A_1 in the A group, an image signal at the LED head 6-2 is stored in the SRAM 514A_2, and an image signal at the LED head 6-3 is stored in the SRAM 514A_3.

The image signals sequentially stored in the three A-group SRAMs 514A_1 to 514A_3 at the transfer rate of 8 MHz are simultaneously read from the three A-group SRAMs (514A_1 to 514A_3) at a transfer rate of 4 MHz for the next second line, and input to the IC 510 again. The image signal is then converted to a unit of 8 pixels from 4 pixels, and transmitted to field memories 515_1 to 515_3 in an image delay memory at a transfer rate of 2 MHz. At this time, the LED head 6-1 does not perform delay operation. The image signal at the LED head 6-2 is transmitted to the field memory 515-1, and the image signal at the LED head 6-3 is transmitted to the field memory 515-3. While read control from the first line SRAM is performed, the image signal on the next line is stored in the three B-group SRAMs 514B_1 to 514B_3, as in the A group.

The read and write operations are performed by toggling the three A-group SRAMs 514A_1 to 514A_3 and the three B-group SRAMs 514B_1 to 514B_3, so that the lines are connected.

Since three A3 width LED heads 6-1 to 6-3, which are the light-emitting-element array unit, are provided in the staggered arrangement, the LED head 6-1 is designated as a reference, and the LED head 6-2 is fitted by shifting it by 17.5 mm in the sub-scanning direction in a mechanical layout. That is, the LED heads (light-emitting-element array units) 6-1 to 6-3 are provided in the staggered arrangement, shifted by a predetermined amount in the sub-scanning direction, when the axial direction of the photosensitive drum 5 is designated as the main-scanning direction, in a state that the LED heads are superposed on each other by a predetermined amount in the main-scanning direction.

Accordingly, if the image signals output from the A-group SRAMs 514A_1 to 514A_3 and the three B-group SRAMs 514B_1 to 514B_3 are simultaneously processed and transferred to the LED head 6-2, the LED head 6-2 shifts by 17.5 mm (17.5 mm/42.3 μm (1 dot in 600 dots per inch (dpi))=416 lines) in the sub-scanning direction with respect to the LED head 6-1 and prints. To correct this mechanical deviation, the image signal from the LED head 6-2 output at 4 MHz from the A group SRAM 514A_2 and the B-group SRAM 514B_2 is written in the field memory 515_1 in a unit of 8 pixels for 180 lines (fixed), in order of transfer lines at a transfer rate of 2 MHz.

The image signals are then read from the field memory 515_1 at 2 MHz in the written order, and at the same time, 236 lines (variable) are written in the cascade-connected field memory 515_2.

The image signals are then read from the field memory 515_2 at 2 MHz in the written order, and input to the IC 510 again as L2DFMO [7:0]. As a result, the image signal from the LED head 6-2 is delayed by 416 lines. The number of lines to be delayed is different individually due to parts accuracy of the LED head 6-2 and assembly difference, and can be controlled in a unit of line (42.3 μm).

Since three A3 width LED heads 6-1 to 6-3 are provided in the staggered arrangement, the LED head 6-1 is designated as a reference, and the LED head 6-3 is fitted by shifting it by 0.5 mm in the sub-scanning direction in the mechanical layout. Accordingly, if the image signals output from the A-group SRAMs 514A_1 to 514A_3 and the three B-group SRAMs 514B_1 to 514B_3 are simultaneously processed and transferred to the LED head 6-3, the LED head 6-3 shifts and prints by 0.5 mm (0.5 mm/42.3 μm (1 dot in 600 dpi)=12 lines) in the sub-scanning direction with respect to the LED head 6-1. To correct this mechanical deviation, the image signal from the LED head 6-3 output at 4 MHz from the A group SRAM 514A_3 and the B-group SRAM 514B_3 is written in the field memory 515_3 in a unit of 8 pixels for 12 lines, in order of transfer lines at a transfer rate of 2 MHz.

The image signals are then read from the field memory 515_3 at 2 MHz in the written order, and input to the IC 510 again as L3DFMO [7:0]. As a result, the image signal from the LED head 6-3 is delayed by 12 lines.

The number of lines to be delayed is different individually due to parts accuracy of the LED head 6-3 and assembly difference, and can be controlled in a unit of line (42.3 μm).

Image data L1DI [7:0] on the LED head 1 from the image-data RAM 1 and image data L2DFNO [7:0] and L3DFMO [7:0] on the LED heads 2 and 3 from the image-data delay unit are stored in the SRAM group 550A_1 to A_3 in an image-data RAM 2 via the IC 510 respectively at a transfer rate of 2 MHz. The stored image data is read four times during the next line interval at a transfer rate of 8 MHz. As for an address, since the LED head has 7680 dots and the data is written in a unit of 8 pixels, there are 960 addresses. The 960 addresses are repeated four times. The image data read in a unit of 8 pixels is converted to a unit of four pixels in the IC 510, and transferred to an image-data output unit 519.

While the image data is read from the SRAM group 550A_1 to A_3, the next line is written in the SRAM group 550B_1 to B_3, and therefore write and read of the lines are alternately performed.

The image data in a unit of four bits on the LED heads 6-1 to 6-3 processed in the image-data. RAM 2 is output together with an LPH control signal, and transferred to respective LED heads 6-1 to 6-3 via drivers at a rate of 8 MHz (L1 to L3CLK are data-fixed at a leading edge and a trailing edge of 4 MHz).

To store correction data for each LED element and correction data for each LED array chip in order to correct a difference in the light amount of respective LED elements, a light-amount correction ROM is installed in the respective LED heads 6-1 to 6-3. At the time of turning on the power, light-amount correction data of the LED head 6-1 is first read by CPLD control of the IC 510, serial-parallel converted, and stored in a light-amount correction RAM 516 according to the address as correction data HOSEID [7:0] in a unit of 8 bits. After all the correction data is stored, the data is read from the light-amount correction RAM 516, and transferred again to the LED head 6-1. This operation is performed sequentially for the LED heads 6-2 and 6-3.

The transferred light-amount correction data is held in the LED heads 6-1 to 6-3, unless the power of the LED heads 6-1 to 6-3 is turned OFF.

A setup of a write condition to the LED write control circuit 502 is controlled by inputting a control signal input data bus LDATA [7:0] from the system controller 302, an address bus LADR [5:0], a latch signal VDBCS, and a P sensor pattern signal SGATE_N to the IC 510.

An image-data transfer controller is formed of the system controller 302 and the LED write control circuit 502.

Figure 4:
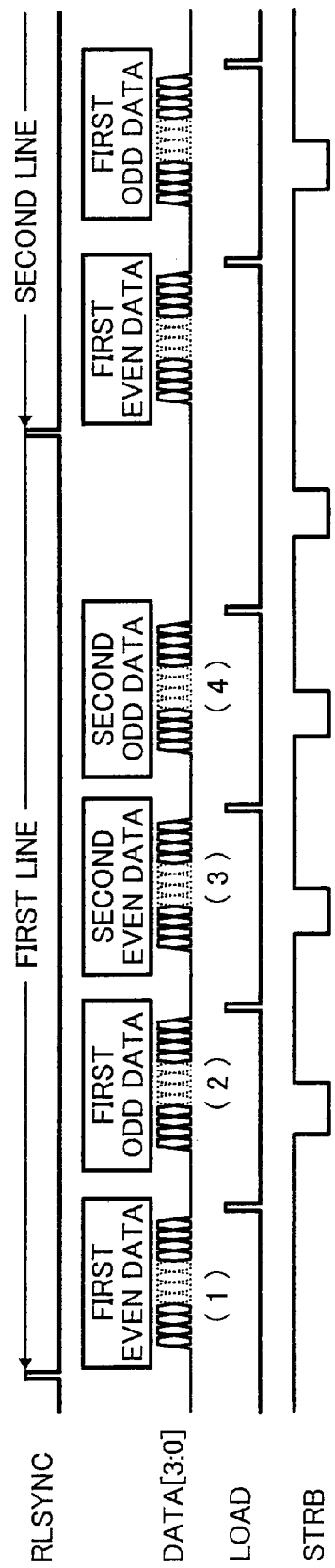
FIG. 4 is a timing chart of data transfer (1) to an LED head.
Figure 5:
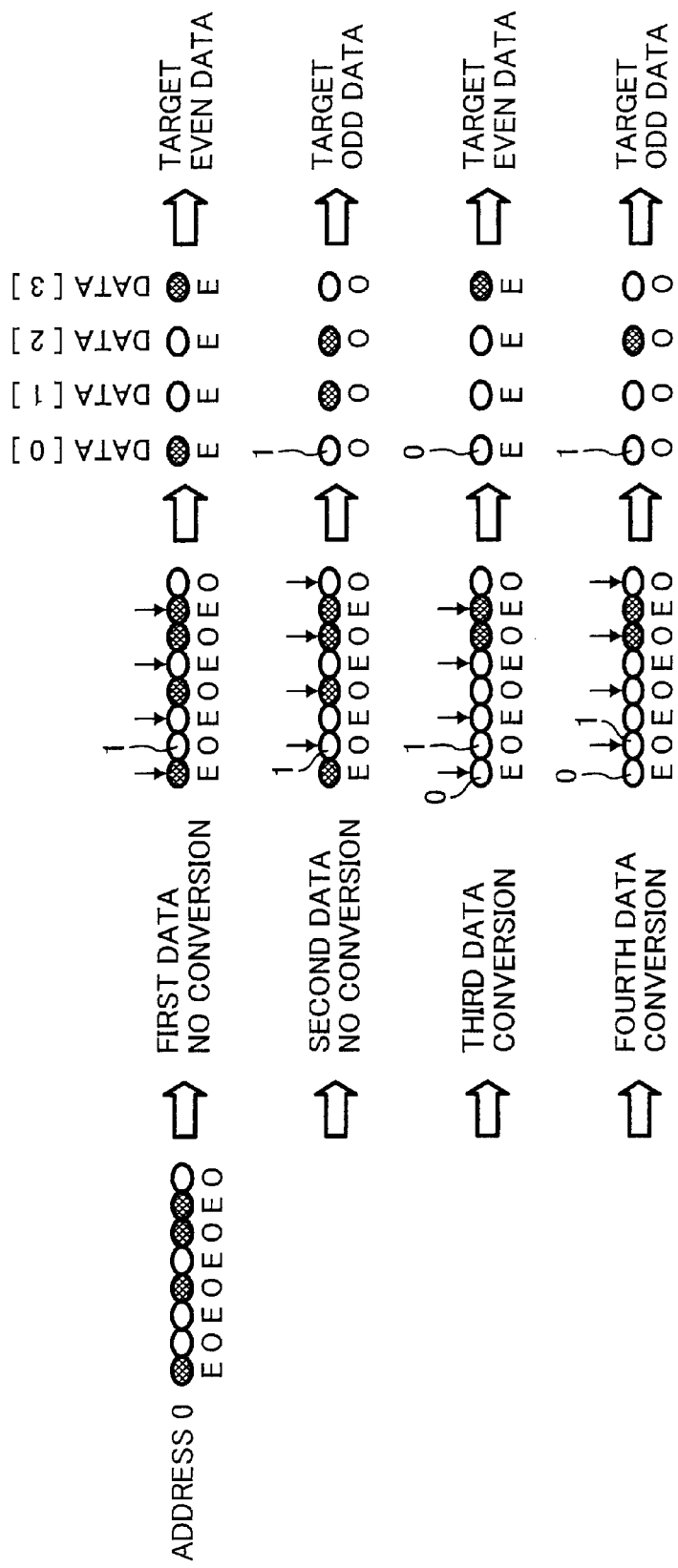
FIG. 5 is an explanatory diagram of a data conversion example (1) of image data.

FIG. 4 is a timing chart of data transfer to the LED head in a method of transfer to the LED head. FIG. 5 is an explanatory diagram of an example of data conversion processing of image data in a unit of 8 pixels.

As shown in FIG. 4, RLSYNC is a main-scanning one line interval, and a series of processing is performed in this interval. The image data is transferred at a leading edge and a trailing edge of the clock. DATA is image data in a unit of 4 pixels.

As for the transferred image data, (1) even pixel data: EVENDATA for 7680 pixels on the LED head is transferred. After the transfer, the data is latched according to a LOAD signal. (2) odd pixel data: ODDDATA is transferred, and latched according to a LOAD signal. While the odd pixel data: ODDDATA is being transferred, the LED is lighted for the latched even pixel data according to a lighting signal STRB (STRB signal: LOW active). (3) even data and (4) odd data are again transferred and latched, and printing and data transfer are repeated twice, to perform printing. That is, data transfer is performed twice in one line interval.

One example of the data conversion processing of image data in a unit of 8 pixels output from the image-data RAMs (550A_1 to 550_3 and 550B-1 to B_3) shown in FIG. 3 is explained next with reference to FIG. 5.

In FIG. 5, as for address 0, if the eight pixel data are rearranged, designating black circle as "1" and white circle as "0", •○○•○••○ becomes 10010110.

As one example, in the eight-pixel image data (10010110) read from the address 0 of the SRAM 550A_1, the even data is targeted in the first transfer, and only the even data is selected from the eight pixels, and transferred to the LED head in a unit of 4 bits. This operation is repeated and the data is transferred for address 0 to address 959. Therefore, in the first transfer, only the EVEN data is selected, and 1001 is transferred from •○○•○••○.

Subsequently, the second data transfer is started, and the odd data is targeted this time in the eight-pixel image data (10010110) read from the address 0 of the SRAM 550A_1, and only the odd data is selected from the eight pixels, and transferred to the LED head in a unit of 4 bits. This operation is repeated and the data is transferred for address 0 to address 959. Therefore, in the second transfer, only the ODD data is selected, and 0110 is transferred from •○○•○••○.

In the conversion from 8 bits to 4 bits in the first and the second data transfers, the data value is not processed, and conversion to 4 bits is performed only by data selection.

Subsequently, the third data transfer is started, and the even data is targeted in the eight-pixel image data read from the address 0 of the SRAM 550A_1. If the data is "0", "0" is directly transferred. If the data is "1", and when the previous pixel (odd pixel) data is "1", "1" is directly transferred. However, if the previous pixel data is "0", the data is converted to "0" and transferred.

In the third image transfer, since data processing is performed by pattern recognition, 10010110 becomes 00000110. That is, in the third image transfer, only the EVEN data is transferred again, one dot is recognized as a vertical line, and data conversion is performed. In other words, if the left and right pixels are 0 data, the data is recognized as a vertical line. As a result, when the input data is converted, •○○•○••○ becomes ○○○○○••○, and if it is expressed in figures, it becomes 00000110. The EVEN data is selected from this pattern, and 0001 is transferred from ○○○○○••○.

Four pixels of the even data, 0001, are selected and transferred to the LED head.

Likewise, in the fourth image transfer, only four pixels of the odd data, 0010, are selected and transferred to the LED head. That is, in the fourth time, since only the ODD data is transferred, 0010 is transferred from ○○○○○••○.

According to the first embodiment, in the data processing of the image data, processing of image data is changed over between output modes including a copy mode and a printer mode. In the copy mode, data transfer is performed only once, and conversion is not controlled. In the printer mode, data transfer is performed twice, and data processing control is performed.

By performing such pattern recognition to process the data, an effect of the vertical width is obtained. The effect of the vertical width is explained below.

That is, the image-data transfer controller performs transfer control several times (according to the present embodiment, performs data transfer twice during one line), while processing the image data for one line during one line interval in the main-scanning, to drive the light-emitting element array. Accordingly, the print density can be increased or decreased with respect to one line width, thereby improving one dot printing rate.

In the image data processing, pattern recognition is performed by one line control in the main-scanning, the circuit configuration becomes simple, and a line drawing in one line interval can be reproduced with high fidelity.

If one-dot isolated vertex, which is a binary image, is recognized, black, that is, "1" is transferred in the first transfer, and white, that is, "0" is transferred in the second transfer. Therefore, the dot diameter can be thinned, and the aspect ratio of one dot can be improved.

Furthermore, the output modes, that is, the copy mode and the printer mode can be changed over, the image in the image processing in the copy mode, and the tone and line drawing in the printer mode can be reproduced with high fidelity.

Figure 6A:
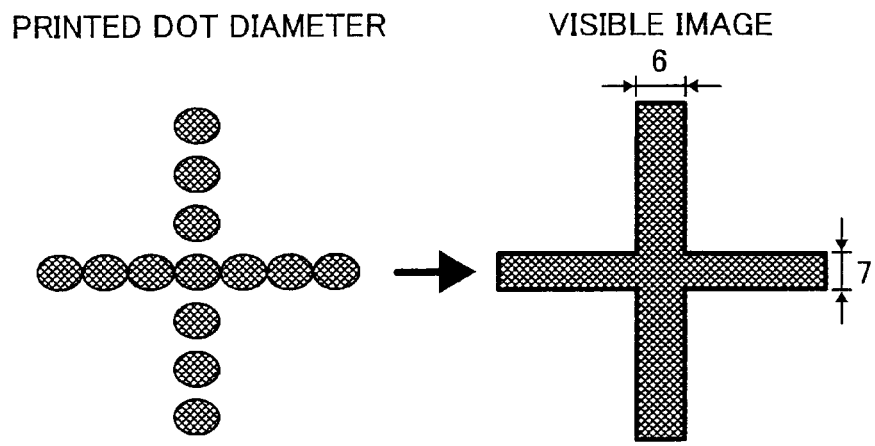
FIGS. 6A to 6C are explanatory diagrams of a relationship between a printed dot diameter of one-dot cross and an visible image.
Figure 6B:
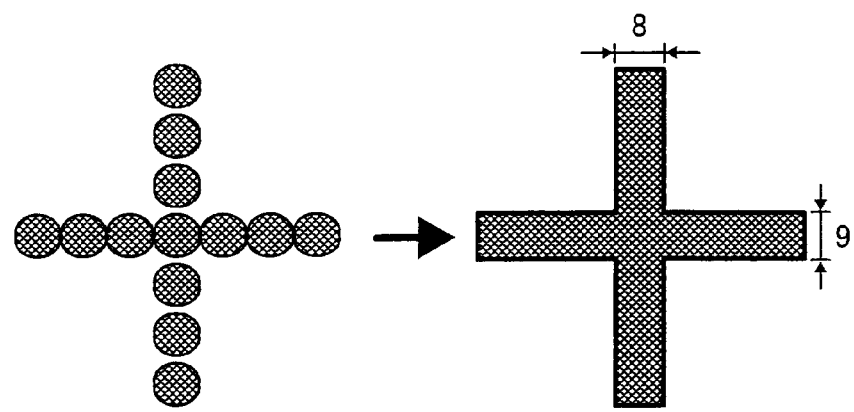
Figure 6C:
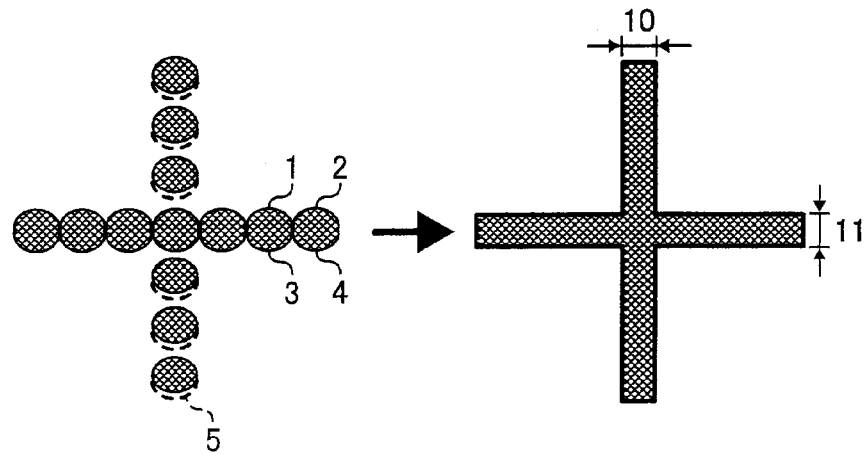

FIGS. 6A to 6C are explanatory diagrams of a relationship between a printed dot diameter of one-dot cross and a visible image of 7 dots in one line in the main-scanning direction and 7 lines in the sub-scanning direction. FIG. 6A depicts a state where data is printed by one data transfer, FIG. 6B depicts a state where data is printed by two data transfers, and FIG. 6C depicts a state where data transfer is performed twice, that is, data "1" and data "0" in a case of a one-dot isolated vertex.

As shown in FIG. 6A, when data transfer of data "1" is performed once and data "1" is printed as in the conventional art, a line width indicated by (6) becomes considerably thick, and a ratio to the horizontal line width increases.

As shown in FIG. 6B, when data transfer of data "1" is performed twice and data "1" is printed twice (that is, data "1" is transferred twice), a horizontal line indicated by (9) becomes slightly thick, and the aspect ratio with respect to a vertical line is improved. However, one-dot line width is thick, and a ratio between a vertical line width indicated by (8) and a horizontal line width indicated by (9) is still different.

According to the first embodiment, as shown in FIG. 6C, data transfer is performed twice. However, in the case of one-dot isolated vertex, that is, in the case of one-dot vertical line, data "1" is transferred in the first transfer, and data "0" is transferred in the second transfer.

Accordingly, as indicated by (5) (one-dot isolated vertex) in FIG. 6C, data "1" is printed for the first time. However, printing is not performed for the second time because data is "0". As a result, a line width indicated by (10) becomes thin, and a horizontal line indicated by (11) becomes slightly thick, thereby equalizing the ratio between the vertical line width indicated by (10) and the horizontal line width indicated by (11).

As shown in FIG. 6C, (1) to (4) denote horizontal lines, and these are not the one-dot isolated vertex. As a result, data "1" is transferred twice, and printed.

Thus, the image data is transferred twice during one line interval in order of even pixel data to odd pixel data to even pixel data to odd pixel data, and the one-dot isolated vertex is pattern-recognized and data processed, thereby thinning the vertical line to improve the aspect ratio.

If the time for transferring data "1" for the first time, for transferring data "0" for the second time, and for printing the data is set to be 100, normally, the time becomes 100 by one transfer of data "1". However, according to the present embodiment, the time becomes 100 by two transfers of data "1".

Therefore, since data "1" is transferred for the first time, and data "0" is transferred for the second time, the printing time becomes half, and in the fourth line, there is a one-dot horizontal line and an adjacent dot. Therefore, that means it is not an isolated vertex, and data "1" is transferred twice, to make the printing time 100 (FIG. 6C, (1) to (4)).

Thus, in the case of one-dot vertical line, the data amount is reduced, to thin the line by a reduction in the printing time.

A configuration of a copying machine according to a second embodiment of the present invention is the same as those shown in FIGS. 1 to 3, and the explanation thereof is omitted.

The overall configuration of the machine, specific transfer control of image data to LED heads in the second embodiment formed of the LED write control circuit 502, lighting time, printed dot diameter, and an image are explained below.

Figure 7:
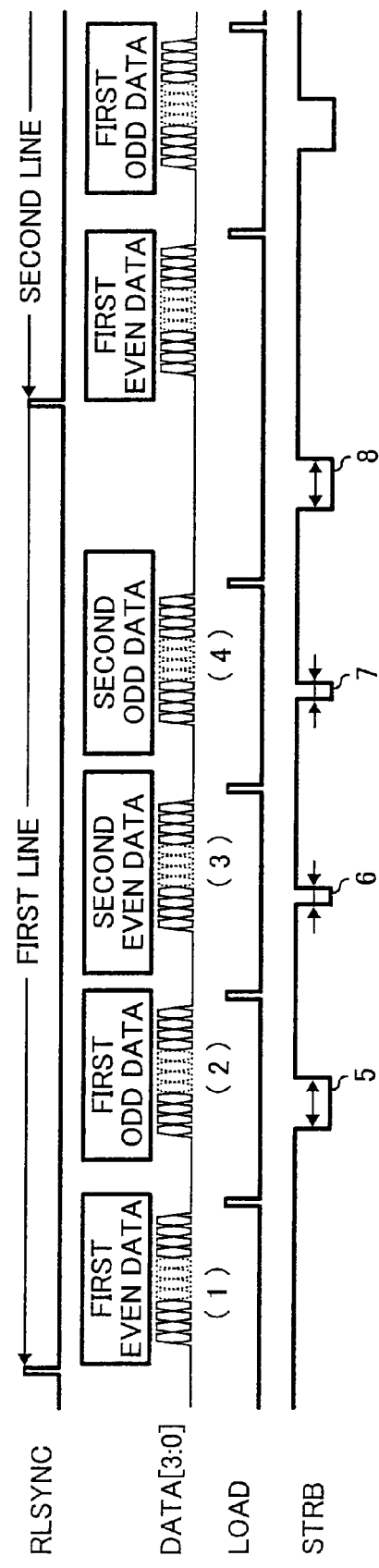
FIG. 7 is a timing chart of data transfer (2) to the LED head.

FIG. 7 is a timing chart of data transfer to the LED head. RLSYNC is a main-scanning one line interval, and the image data is transferred at a leading edge and a trailing edge of the clock. DATA is image data in a unit of 4 pixels.

As for the transferred image data, (1) even pixel data: EVEN DATA for 7680 pixels (3840 pixels×2) of the LED head is transferred. Since the number of pixels is 3840 dots, which is half the total pixels of the LED head, 7680 dots, and four dots are simultaneously transferred, 3840/4=960 counts. After the transfer, the data is latched according to the LOAD signal. (2) odd pixel data: ODD DATA is transferred, and latched according to the LOAD signal. (3) even data and (4) odd data are transferred and latched, and printing and data transfer are repeated twice.

The lighting signal: STRB is LOW active, and for printing of (1) even pixel data, the LED is lighted by setting the STRB to LOW5 at the time of transfer of (2) odd pixel data, and for printing of (2) odd pixel data, the LED is lighted by setting the STRB to LOW6 at the time of transfer of (3) even pixel data.

Printing of (3) even pixel data is performed by setting the STRB to LOW7 at the time of transfer of (4) odd pixel data, and printing of (4) odd pixel data is performed by setting the STRB to LOW8 afterwards.

At this time, the STRB signal indicates LED light emission at LOW, and by controlling the LOW period, the image printing time is adjusted, and the dot power can be controlled, thereby equalizing the image density. The image density is regulated according to the process condition and the like, and as the machine condition, the STRB lighting and printing at about 10% of the main-scanning one line interval is appropriate. If the 10% is calculated according to a relation between copying linear velocity and the pixel density, the main-scanning interval is 705.6 μs and 10% thereof is 70.56 μs as the lighting period.

In the copy mode, control is performed such that data transfer is performed once, and the lighting signal is emitted once, that is, data transfer (1) to data transfer (2), and the STRB is 5 and 6, 10% printing is performed at 5 and 6. In this case, data transfer is performed twice {(1) and (2) for the first time, and (3) and (4) for the second time}, and duty 10% printing is performed at 5 and 7 of the STRB signal, and duty 10% printing is performed at 6 and 8. This 10% is divided to 3:1 in ratio control, and transferred. Accordingly, it becomes 7.5% and 2.5%.

Main-scanning 0 to 23 . . . is one line data, and sub-scanning 1 to 5 indicates the number of lines, which becomes a storing unit for a plurality of lines. According to the storing unit, main and sub matrix patterns are established.

A target line sub-scanning 3 is explained as one example from the stored data for each line. A pixel 600 in the target pixel (main-scanning 1) is black, and data is "1". The pixel 600 can be determined to be a diagonal line, as seen in a 3×3 pixel matrix in main and sub-scanning, surrounding the pixel 600.

According to determination only in the main-scanning direction, the pixel 600 is determined as a one-dot isolated vertex. However, in the main and sub matrix patterns, if it is a diagonal line, it fits to a predetermined pattern, and it becomes 11b in four-value coding. As a result, the diagonal line image can be made clear by not thinning out the data.

According to the method explained above, when pixels in the third sub-scanning line as the target line is sequentially determined according to the matrix, in a pixel 601 in main-scanning 5, it is determined to be a vertical line according to the matrix. When the binary data is converted to four-value coding, it is also determined whether it is an even pixel or an odd pixel, and if it is determined to be odd in a vertical pattern, the pixel 601 is 01b code.

A pixel 602 is determined to be odd in a horizontal line and becomes 11b code. A pixel 603 is determined to be odd and becomes 00b code, a pixel 604 is determined to be even as one-dot isolated vertex and becomes 10b code, and a pixel 605 is determined to be even of a diagonal line and becomes 11b code.

Thus, by simultaneously extracting main and sub pixels surrounding the target pixel from the storing unit, data of the target pixel can be recognized, and a line drawing can be expressed with high fidelity in a unit of one pixel.

Furthermore, pixels in the surrounding matrix can be extended from 3×3 pixels to 5×5 pixels, so that variation of the pattern can be increased. Since the main and sub pixel matrix surrounding the target pixel can be set by the operation, the data pattern can be increased or decreased, thereby enabling reproduction of the line drawing with higher fidelity.

Furthermore, by coding the target pixel from binary to four values, image data conversion to the LED head is enabled. Accordingly, by converting the binary data to four-value coding, data in a unit of one pixel can be subdivided.

Identification of coded pixel is determined by recognizing a preset pattern. Therefore, data in a unit of one pixel can be subdivided, a ratio of vertical, horizontal, and diagonal line width can be improved.

Furthermore, main and sub-scanning patterns to be determined can be optionally set. Accordingly, a thin line matched with user's requirements can be highlighted.

The pattern-recognized pixel codes of sub-scanning 3 as a target line 606 are shown in FIG. 5. The converted pixels are the target pixels 601 and 604. The coded pixel is read from the image-data RAM in FIG. 3 in a unit of four pixels, and converted to a unit of 8 pixels by latching one unit, from which the even pixels and the odd pixels are selected in a unit of four pixels. The data transfer order of (1) to (4) has been explained with reference to FIGS. 7, and (1) to (4) in FIG. 8 correspond thereto.

Figure 8A:
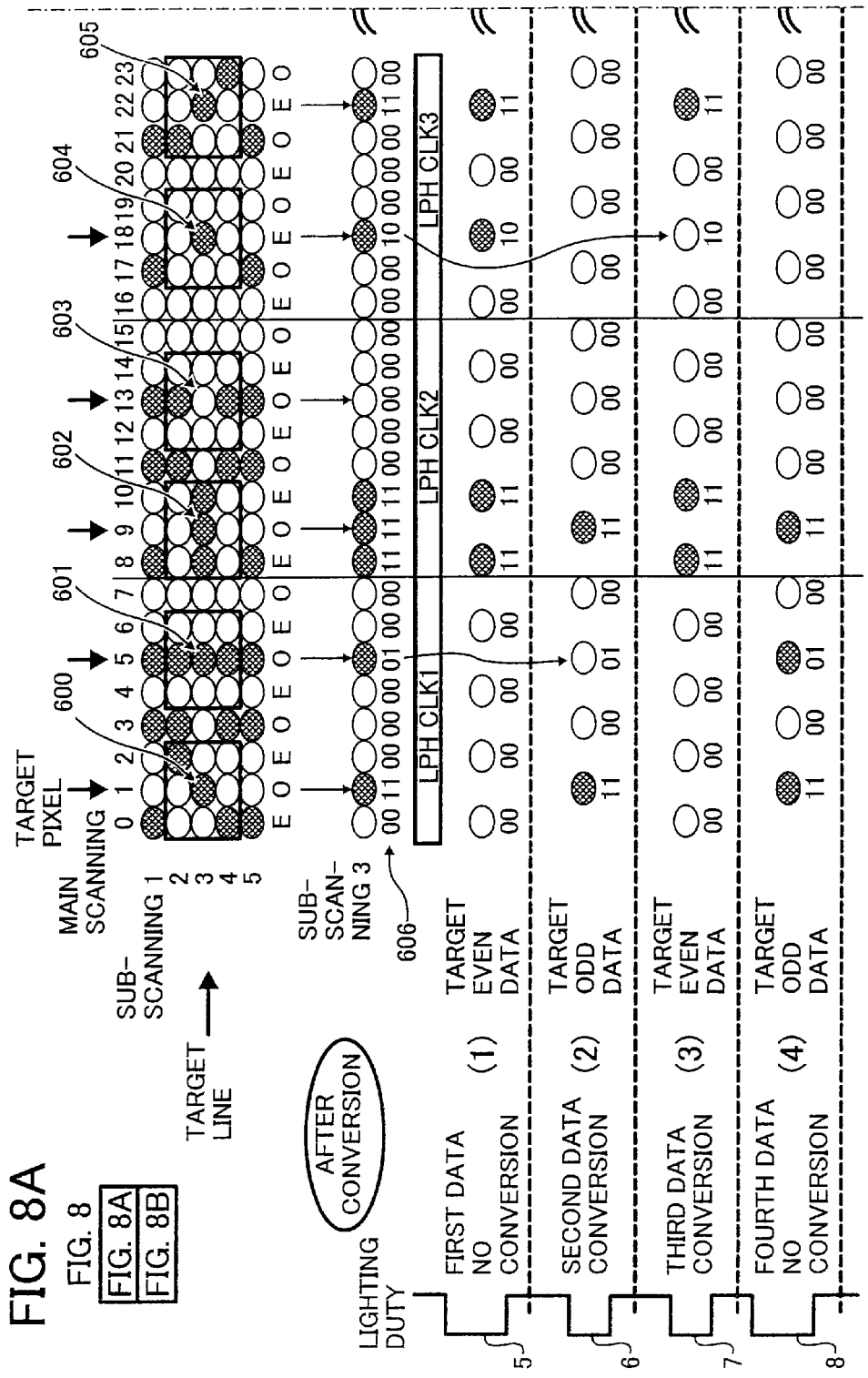
FIG. 8 is an explanatory diagram a data conversion example (2) of image data.
Figure 8B:
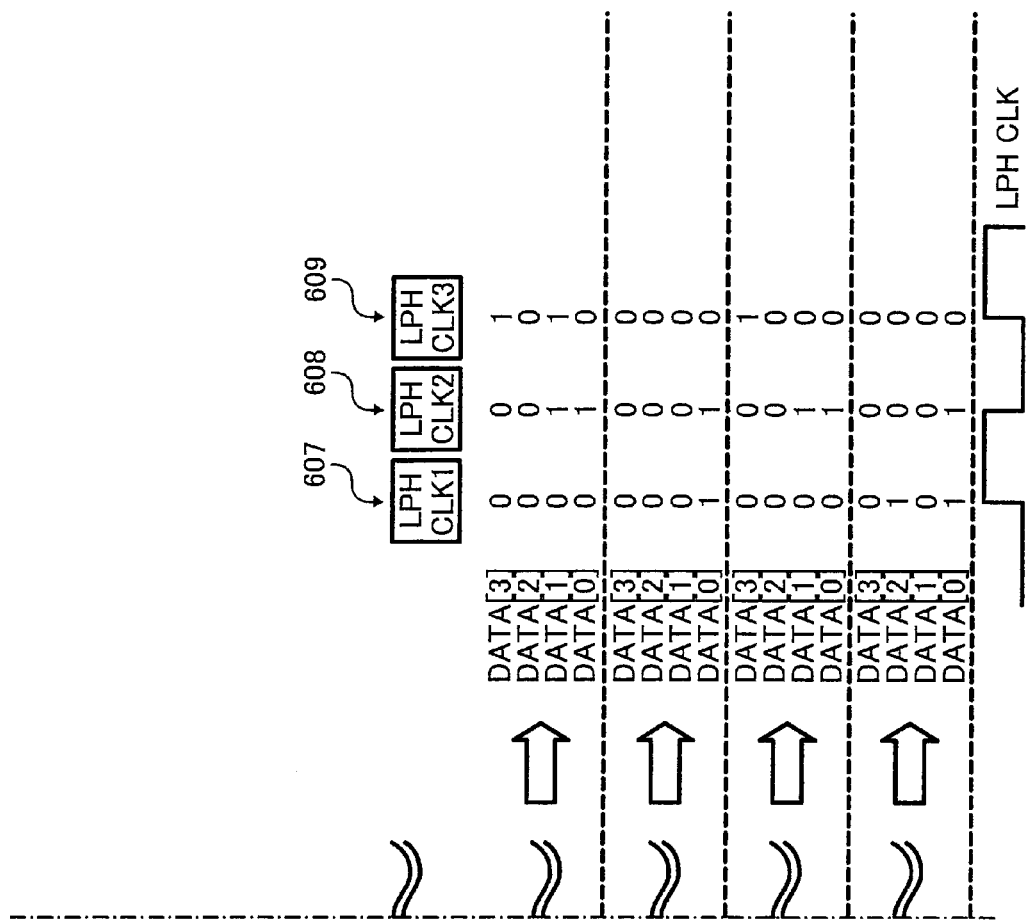

(1) and (3) in FIG. 8 are even data, and only the even data are selected from the coded pixels in the target line 606, and coding is converted to one-bit data. In (1), 00b is converted to 0, 10 to 1, and 11 to 1, and in (3) 00b is converted to 0, 11 to 1 as in (1), and 10b to 0.

Data values of LPHCLK1/607 and LPHCLK2/608 are the same, however, in LPHCLK3/609, 1010 in (1), whereas 1000 in (3), which makes the data 0. Even if the lighting signal is turned ON, since the data is 0, printing is not performed. Hence, the lighting time is only for the first lighting signal, and the line width can be thinned.

Furthermore, (2) and (4) in FIG. 8 are odd data, and only odd coded pixels in the target line 606 are selected. When coding is converted to one-bit data, 01b code is converted to 0 in (2), and to 1 in (4), thereby performing data conversion. Accordingly, in LPHCLK1/607, 0001 in (2), whereas 0101 in (4).

As described above, a certain target pixel is coded from the main and sub-scanning patterns, is read several times during one line interval and transferred, thereby thinning the line according to data conversion and lighting time. In this example, since the coded pixel is individually converted from four-value coding to binary data for each time by read and transfer several times during one line interval, the thin line can be reproduced with high fidelity in any pattern.

Furthermore, the output modes, that is, the copy mode and the printer mode can be changed over, the image in the image processing in the copy mode, and the tone and line drawing in data processing in the printer mode can be reproduced with high fidelity. This control is in the printer mode.

Figure 9:
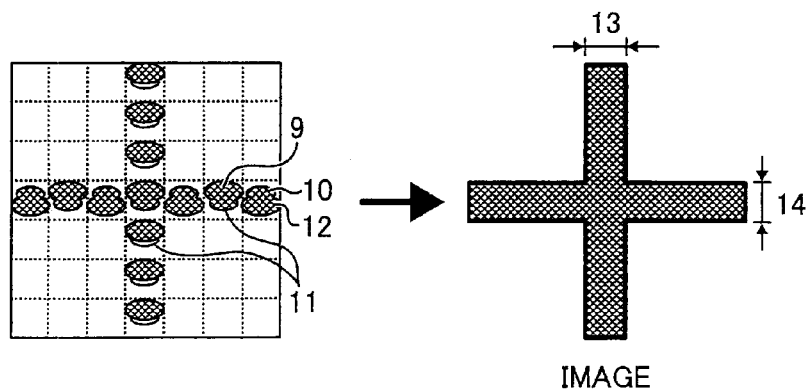
FIG. 9 is an explanatory diagram a dot diameter and an image (one-dot lattice)

Subsequently, printed dot diameter of one-dot cross and an image are explained with reference to FIG. 9.

First, even pixel data 9 is printed at duty 7.5%, and odd data 10 is printed at duty 2.5%. Since it is at duty 2.5%, the lighting time is short, and the density becomes thin.

Even pixel data 11 is then printed at duty 2.5%. When a one-dot isolated vertex is pattern-recognized, since data is 0, printing is not performed. Lastly, odd data 12 is printed at duty 7.5%.

As for the dot diameter, the vertical line is printed only at duty 7.5% according to the data processing control, and the horizontal line is printed at duty 10% (2.5%+7.5%), and the density is highlighted due to an edge effect. According to the printing mode explained above, a ratio between a vertical line width 13 and a horizontal line width 14 of the image is improved.

Figure 10:
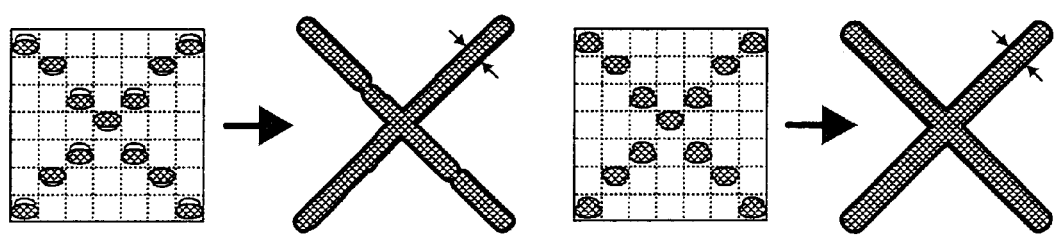
FIG. 10 is an explanatory diagram a dot diameter and an image (one-dot diagonal).

Print dots of a diagonal line and an image are explained with reference to FIG. 10. Conventionally, in a case of a diagonal line, it is recognized as a vertical line as in FIG. 9, due to a control at the one-dot isolated vertex in the main-scanning direction, and if it is even pixel data, printing is performed for the first time, and not performed for the second time. Thus, printing is performed at duty 7.5% instead of duty 10%, thereby thinning the density, and the line is blurred accordingly. Therefore, in the present invention, printing is performed for the first and the second times by recognizing the diagonal line according to the main and sub-scanning patterns, and the density becomes the same as in the copy mode, with the lighting time at duty 10%, thereby enabling expression of lines in various patterns with high fidelity.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image writing device comprising:
a light-emitting element array unit including
a light-emitting element array formed with a plurality of light-emitting elements arranged in one direction, a light emission of the light-emitting elements being controlled based on binary image data; and
an image forming unit that forms an image of lights emitted by the light-emitting element array on a photo-sensitive element;
an image-data transfer controller that transfers image data corresponding to one line in a main scanning direction of the photo-sensitive element by two transferring operations to the light-emitting element array unit, to drive each of the light-emitting elements in the light-emitting element array unit for an exposure of the photo-sensitive element in the main-scanning direction; and
a plurality of storing units that store at least three lines of image data transferred by the image-data transfer controller,
wherein the image-data transfer controller reads out a data matrix made of at least three pixels in the main scanning direction and at least three pixels in a sub scanning direction around a target pixel from the storing units, converts the binary data to multi-valued data with respect to the target pixel on the basis of a pattern of the matrix, determines whether the multi-valued target data is to be converted from black data to white data, and transfers the multi-valued target data by the two transfer operations depending on a result of the determination.

2. The image writing device according to claim 1, wherein the image-data transfer controller includes a determining function to determine whether the target pixel is the black data and an isolated point on the basis of the pattern of the matrix, and if the image-data transfer controller determines that the target pixel is the black data and the isolated point, the multi-valued target data is determined to be converted from black data to white data, and the image-data transfer controller performs the two transfer operations to transfer the white data converted from the black data in one transfer operation and transfer the black data as it is in another transfer operation.

3. The image writing device according to claim 1, wherein the image-data transfer controller includes a determining function to determine whether the target pixel is the black data and a part of a diagonal line on the basis of the pattern of the matrix, and if the image-data transfer controller determines that the target pixel is the black data and the part of the diagonal line, the image-data transfer controller performs the two transfer operations to transfer the black data as it is in both transfer operations.

4. The image writing device according to claim 1, wherein the image-data transfer controller includes a determining function to determine whether the target pixel is the black data and a part of a sub scanning direction line on the basis of the pattern of the matrix, and if the image-data transfer controller determines that the target pixel is the black data and the part of the sub scanning direction line, the multi-valued target data is determined to be converted from black data to white data, and the image-data transfer controller performs the two transfer operations to transfer the white data converted from the black data in one transfer operation and transfer the black data as it is in another transfer operation.

5. The image writing device according to claim 1, wherein the image-data transfer controller includes a determining function to determine whether the target pixel is the black data and a part of a main scanning direction line on the basis of the pattern of the matrix, and if the image-data transfer controller determines that the target pixel is the black data and the part of the main scanning direction line, the image-data transfer controller performs the two transfer operations to transfer the black data as it is in both transfer operations.

6. The image writing device according to claim 1, further comprising a setting unit that sets a size of the matrix to a predetermined pattern.

7. The image writing device according to claim 6, wherein the image-data transfer controller converts the binary data to four-valued data with respect to the multi-valued target data on the basis of the predetermined pattern of the matrix which is set by the setting unit.

8. The image writing device according to claim 6, wherein the setting unit is capable of setting the predetermined pattern arbitrarily.

9. The image writing device according to claim 1, wherein a plurality of the light-emitting element array unit is arranged in a staggered pattern, being shifted by a predetermined amount in the sub scanning direction, and overlapped by a predetermined amount in the main scanning direction.

10. An image forming apparatus comprising an image writing device which includes:
 a light-emitting-element array unit including
  a light-emitting element array formed with a plurality of light-emitting elements arranged in one direction, a light emission of the light-emitting elements being controlled based on binary image data; and
  an image forming unit that forms an image of lights emitted by the light-emitting element array on a photo-sensitive element;
 an image-data transfer controller that transfers image data corresponding to one line in a main scanning direction of the photo-sensitive element by two transferring operations to the light-emitting element array unit, to drive each of the light-emitting elements in the light-emitting element array unit for an exposure of the photo-sensitive element in the main-scanning direction; and
 a plurality of storing units that store at least three lines of image data transferred by the image-data transfer controller,
 wherein the image-data transfer controller reads out a data matrix made of at least three pixels in the main scanning direction and at least three pixels in a sub scanning direction around a target pixel from the storing units, converts the binary data to multi-valued data with respect to the target pixel on the basis of a pattern of the matrix, determines whether the multi-valued target data is to be converted from black data to white data, and transfers the multi-valued target data by the two transfer operations depending on a result of the determination.

\* \* \* \* \*